United States Patent
Cheng

(10) Patent No.: US 8,477,681 B2
(45) Date of Patent: Jul. 2, 2013

(54) METHOD FOR DISTRIBUTING NETWORK RESOURCES AND USER EQUIPMENT THEREOF

(75) Inventor: Tsung-Yo Cheng, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 66 days.

(21) Appl. No.: 12/344,588

(22) Filed: Dec. 28, 2008

(65) Prior Publication Data

US 2009/0168669 A1 Jul. 2, 2009

(30) Foreign Application Priority Data

Dec. 31, 2007 (TW) ............................... 96151636 A

(51) Int. Cl.
*H04B 7/212* (2006.01)

(52) U.S. Cl.
USPC ............ 370/322; 370/321; 370/326; 370/329

(58) Field of Classification Search
USPC ................... 455/550.1, 414.1, 423, 450, 464, 455/510; 370/252, 329, 341, 342, 389, 401; 709/217, 233, 234, 236
See application file for complete search history.

(56) References Cited

U.S. PATENT DOCUMENTS

| | | | |
|---|---|---|---|
| 2002/0110106 A1* | 8/2002 | Koo et al. | 370/341 |
| 2003/0139186 A1* | 7/2003 | Igarashi et al. | 455/438 |
| 2004/0218556 A1* | 11/2004 | Son et al. | 370/311 |
| 2005/0250529 A1* | 11/2005 | Funnell et al. | 455/525 |
| 2006/0063544 A1* | 3/2006 | Zhao et al. | 455/510 |
| 2006/0223538 A1* | 10/2006 | Haseba et al. | 455/436 |
| 2007/0123266 A1* | 5/2007 | Polisetty et al. | 455/452.2 |

FOREIGN PATENT DOCUMENTS

| | | |
|---|---|---|
| CN | 1419200 A | 5/2003 |
| CN | 1805588 A | 7/2006 |
| TW | 200738017 | 10/2007 |

OTHER PUBLICATIONS

Office action mailed on Jan. 5, 2012 for the Taiwan application No. 096151636, filing date Dec. 31, 2007, p. 1-4.

* cited by examiner

*Primary Examiner* — Robert Scheibel
*Assistant Examiner* — Anez Ebrahim
(74) *Attorney, Agent, or Firm* — Winston Hsu; Scott Margo

(57) ABSTRACT

A method for distributing network resource is disclosed. The method includes transmitting a service request to a network for requesting that a connection be established between the network and a user equipment, determining whether the network is in a resource limited status, and controlling a time interval for transmitting another service request to the network when the network is in the resource limited status.

7 Claims, 4 Drawing Sheets

METHOD FOR DISTRIBUTING NETWORK RESOURCES AND USER EQUIPMENT THEREOF

BACKGROUND OF THE INVENTION

1. Field of the Invention

The present disclosure relates to a wireless communication system, and more particularly, to a method for controlling a time interval for transmitting service requests to a network to distribute network resources.

2. Description of the Prior Art

With the arrival of the information age, the requirements for mobile voice and data communications, and various other mobile services are increasing daily. The communication systems of prior art are facing bottlenecks of channel usage overflow and inefficient transmission speeds. Therefore, third generation mobile communication has been developed to make better use of the frequency spectrum and higher-speed transmission service. Third generation mobile communication has various versions, of which presently the universal mobile telecommunications system (UMTS) provided with the European standard is the one most expected worldwide due to considerations of system compatibility and manufacturer support.

Please refer to FIG. 1. FIG. 1 is a simplified diagram of a conventional UMTS network in the prior art, which includes at least one user equipment (UE) 110 and 120, and a UMTS terrestrial radio access network (UTRAN) 140. Generally speaking, the user equipment can be a mobile device, such as a mobile phone or a personal digital assistant (PDA). The UTRAN 140 includes a base transceiver station (which is termed "node-B" in UMTS) 150 and a base station controller (which is termed "radio network controller, RNC" in UMTS) 160.

Please keep referring to FIG. 1. In a wideband code division multiple access (WCDMA) network, the UTRAN 140 is often faced with a resource limited condition. Under such conditions, the UTRAN 140 transmits a radio resource control (RRC) connection release command to the user equipment 110 and 120 to release present RRC connections. If the user equipment 110 and 120 has more data to transmit, the user equipment 110 and 120 transmits service requests to the UTRAN 140 to establish RRC connections.

Because the third generation mobile communication standard has not defined how to deal with the resource limited condition, the user equipment 110 and 120 directly transmits the service requests to the UTRAN 140 to require more network resources if more data needs to be transmitted. Thus, the workload of the UTRAN 140 increases, which results in the UTRAN 140 not being able to allocate network resources efficiently.

SUMMARY OF THE INVENTION

It is one of the objectives of the present disclosure to provide a method for distributing network resources and related user equipment to solve the abovementioned problems.

According to an exemplary embodiment of the present disclosure, a method for distributing network resources is provided. The method is used in a user equipment. The method includes transmitting a service request to a network for requesting that a connection be established between the network and the user equipment, determining whether the network is in a resource limited status, and controlling a time interval for transmitting another service request to the network when the network is in the resource limited status. The step of controlling the time interval for transmitting another service request to the network further includes: setting and counting a time value, and transmitting the other service request to the network when the time value is counted to a threshold value.

In one embodiment, the network is a UMTS terrestrial radio access network (UTRAN).

In one embodiment, the connection is a radio resource control (RRC) connection, and the service request is a RRC connection request.

According to another exemplary embodiment of the present disclosure, a user equipment is provided. The user equipment includes a request transmitting module, a judging module, and a time interval control module. The request transmitting module is used for transmitting a service request to a network for requesting that a connection be established between the network and the user equipment. The judging module is used for determining whether the network is in a resource limited status. The time interval control module is coupled to the request transmitting module and the judging module for controlling the request transmitting module over a time interval for transmitting another service request to the network when the judging module determines that the network is in the resource limited status.

In one embodiment, the time interval control module further includes a counter for counting a time value. The time interval control module controls the request transmitting module to transmit the other service request to the network when the counter counts the time value to a fixed or unfixed threshold value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
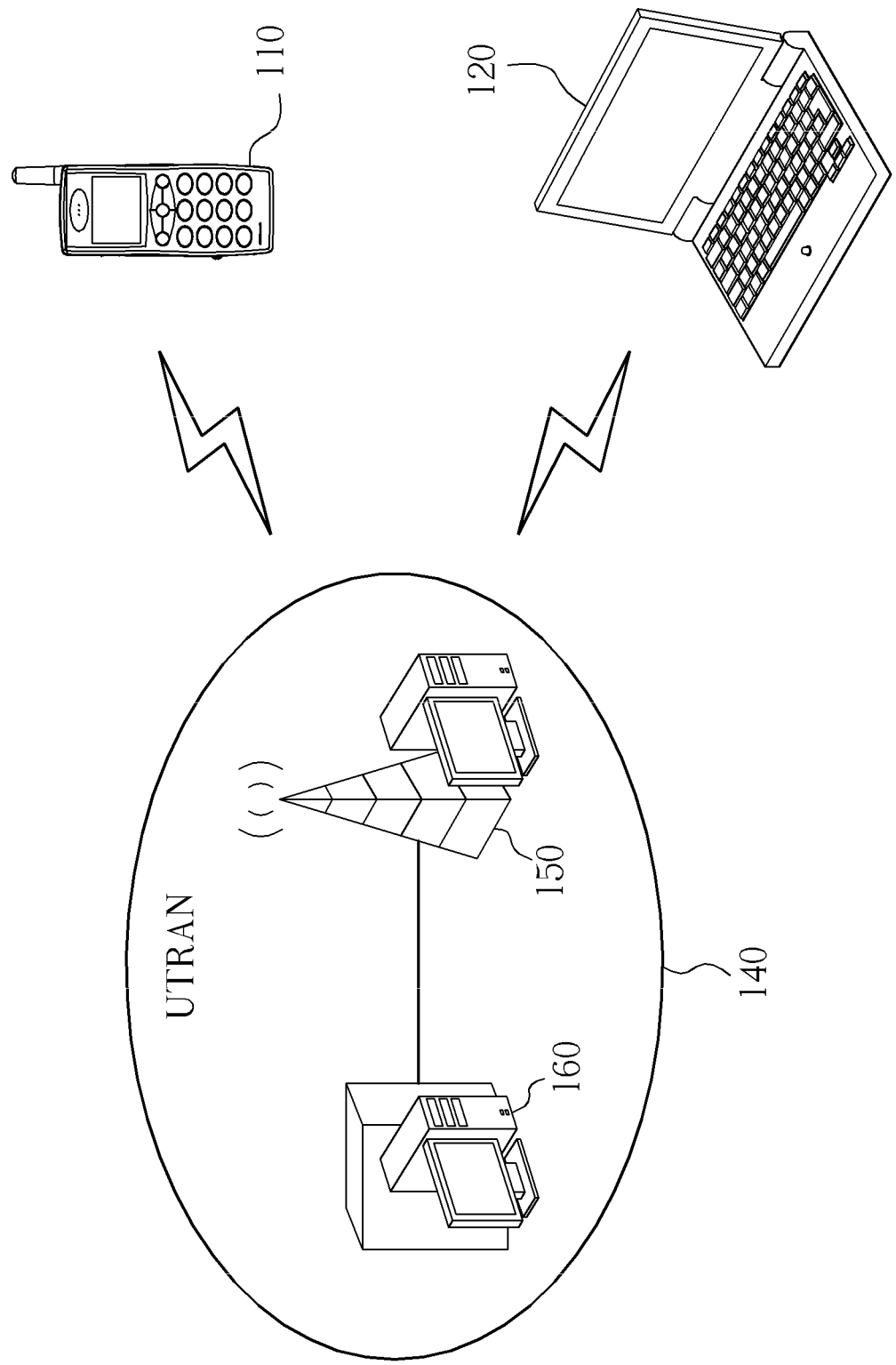
FIG. 1 is a simplified diagram of a conventional UMTS network in the prior art.
Figure 2:
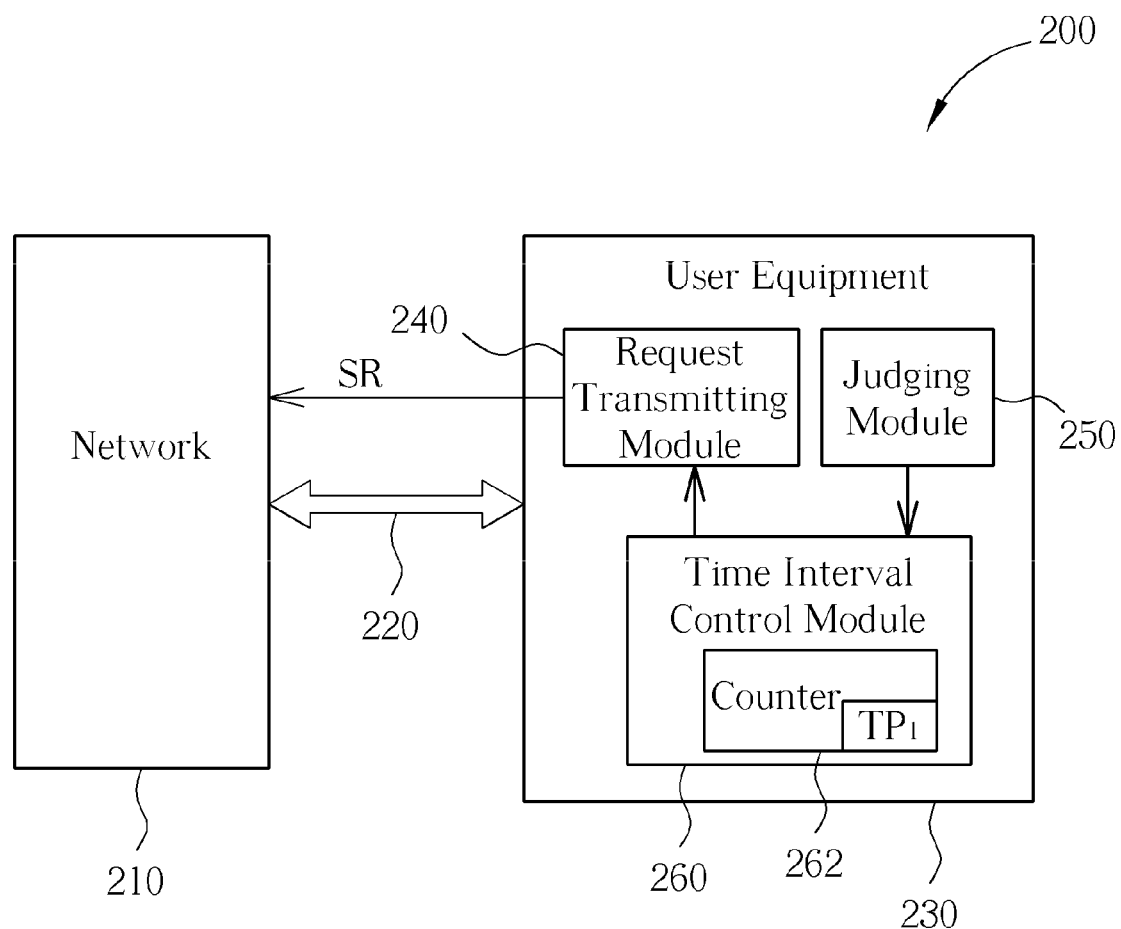
FIG. 2 is a diagram of a wireless network system according to an embodiment of the present disclosure.

Please refer to FIG. 2. FIG. 2 is a diagram of a wireless network system 200 according to an embodiment of the present disclosure. As shown in FIG. 2, the wireless network system 200 includes a network 210 and a user equipment 230 conforming to an embodiment of the present disclosure. The user equipment 230 includes a request transmitting module 240, a judging module 250, and a time interval control module 260. The time interval control module 260 includes a counter 262 for counting a time value to a threshold value $TP_1$. When the user equipment 230 asks for network resource from the network 210, the request transmitting module 240 transmits a service request SR to the network 210 for requesting a connection 220 established between the network 210 and the user equipment 230. The judging module 250 is used for determining whether the network 210 is in a resource limited status. The time interval control module 260 is coupled to the request transmitting module 240 and the judging module 250. When the judging module 250 determines that the network 210 is in the resource limited status, the time interval control module 260 controls the request transmitting module 240 over the time interval for transmitting the service request SR to the network 210. In this embodiment, when the connection 220 between the user equipment 230 and the network 210 is unable to be established or when a release command for releasing the connection 220 is unexpectedly received from the network 210 after the connection 220 is established, the judging module 250 determines that the network 210 is in the resource limited status. The operations of each element of the network 210 and the user equipment 230 will be detailed in the following embodiments.

Please note that the abovementioned network 210 can be a UMTS terrestrial radio access network (UTRAN), but is not limited to this only. In addition, the network 210 and the user equipment 230 conform to the $3^{rd}$ generation partnership project (3GPP). Please note that again, the abovementioned connection 220 can be a radio resource control (RRC) connection, the service request SR can be a RRC connection request, and the release command can be a RRC connection release command, but these are not limited to this only.

In one embodiment, the user equipment 230 can be a mobile phone or a personal digital assistant (PDA), but those skilled in the art should know that this is not a limitation of the present disclosure and can be other types of user equipment.

Figure 3:
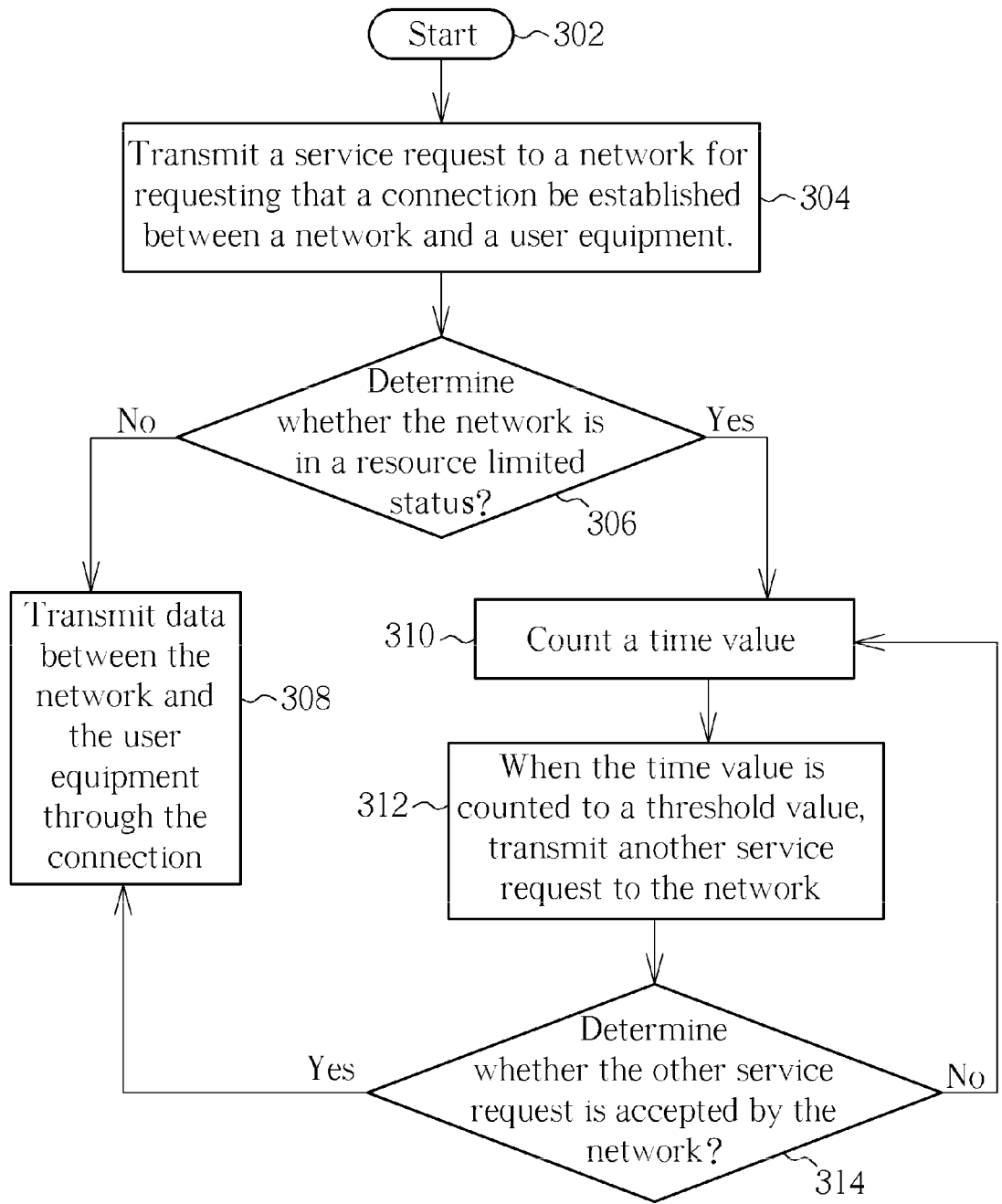
FIG. 3 is a flowchart illustrating a method for distributing network resources according to an exemplary embodiment of the present disclosure.

Please refer to FIG. 3. FIG. 3 is a flowchart illustrating a method for distributing network resources according to an exemplary embodiment of the present disclosure. Please note that the following steps are not limited to being performed according to the sequence shown in FIG. 3 if a roughly identical result can be obtained. The method includes the following steps:

Step 302: Start.

Step 304: Transmit a service request to a network for requesting that a connection be established between a network and a user equipment.

Step 306: Determine whether the network is in a resource limited status. When the network is in the resource limited status, go to Step 310; otherwise, go to Step 308.

Step 308: Transmit data between the network and the user equipment through the connection.

Step 310: Count a time value.

Step 312: When the time value is counted to a threshold value, transmit another service request to the network.

Step 314: Determine whether the other service request is accepted by the network. When the network accepts the other service request, go to Step 308; otherwise, go back to Step 310.

In the following description, how each element operates is described by collocating the steps shown in FIG. 3 and the elements shown in FIG. 2. In Step 304, the request transmitting module 240 of the user equipment 230 transmits the service request SR to the network 210 for requesting that a connection 220 be established between the network 210 and the user equipment 230. At this time, the judging module 250 determines whether the network 210 is in the resource limited status (Step 306). In the following, descriptions are divided into two conditions. In the first condition, the network 210 is not in the resource limited status, and thus data can be transmitted between the network 210 and the user equipment 230 through the connection 220 (Step 308). In the second condition, the network 210 is in the resource limited status. In this embodiment, the judging module 250 will determine that the network 210 is in the resource limited status when the connection 220 is unable to be established between the network 210 and the user equipment 230 or when a release command for releasing the connection 220 is unexpectedly received from the network 210 after the connection 220 is established. At this time, the counter 262 of the time interval control module 260 counts a time value, and then the request transmitting module 240 transmits another service request SR to the network 210 when the time value is counted to the threshold value $TP_1$ (Steps 310-312). The threshold value $TP_1$ can be a fixed value, for example, the other service request SR is transmitted at six-second intervals. The threshold value $TP_1$ can be an unfixed value. For example, the time interval for a first attempt on transmitting the other service request SR is three seconds, the time interval for a second attempt on transmitting the other service request SR is six seconds, and the time interval for a third attempt on transmitting the other service request SR is twelve seconds, and the rest can be deduced by analogy. After that, the judging module 250 determines whether the other service request SR is accepted by the network 210 (Step 314). When the network 210 accepts the other service request SR, the connection 220 established between the network 210 and the user equipment 230 can be utilized for transmitting data (go back to Step 308). When the network 210 refuses to accept the other service request SR, the connection 220 cannot be established or will be immediately released after establishment. At this time, the counter 262 continuously counts the time value, and then the request transmitting module 240 transmits another service request SR to the network 210 when the time value is counted to the threshold value $TP_1$ (back to the steps 310-312).

The steps of the method mentioned above are merely a practicable embodiment of the present disclosure, and in no way should be considered to be limitations of the scope of the present disclosure. The method can include other intermediate steps or several steps can be merged into a single step for suitable modifications without departing from the spirit of the present disclosure. For example, Step 306 can be divided into two steps:

Step 3061: Determine whether the user equipment is in a CELL_DCH status; and

Step 3062: When the user equipment is in the CELL_DCH status, judge that the network is in the resource limited status.

The abovementioned CELL_DCH status is one of the four defined RRC statuses when the user equipment 230 enters the connected mode. These four RRC statuses include the CELL_DCH status, the CELL_FACH status, the CELL_PCH status, and the URA_PCH status, which reflect the type of connection and transmission channels of the user equipment 230. Descriptions of the radio resource control (RRC) layer have already been detailed in the manual of the $3^{rd}$ generation partnership project (3GPP), and further description is omitted here for brevity.

Figure 4:
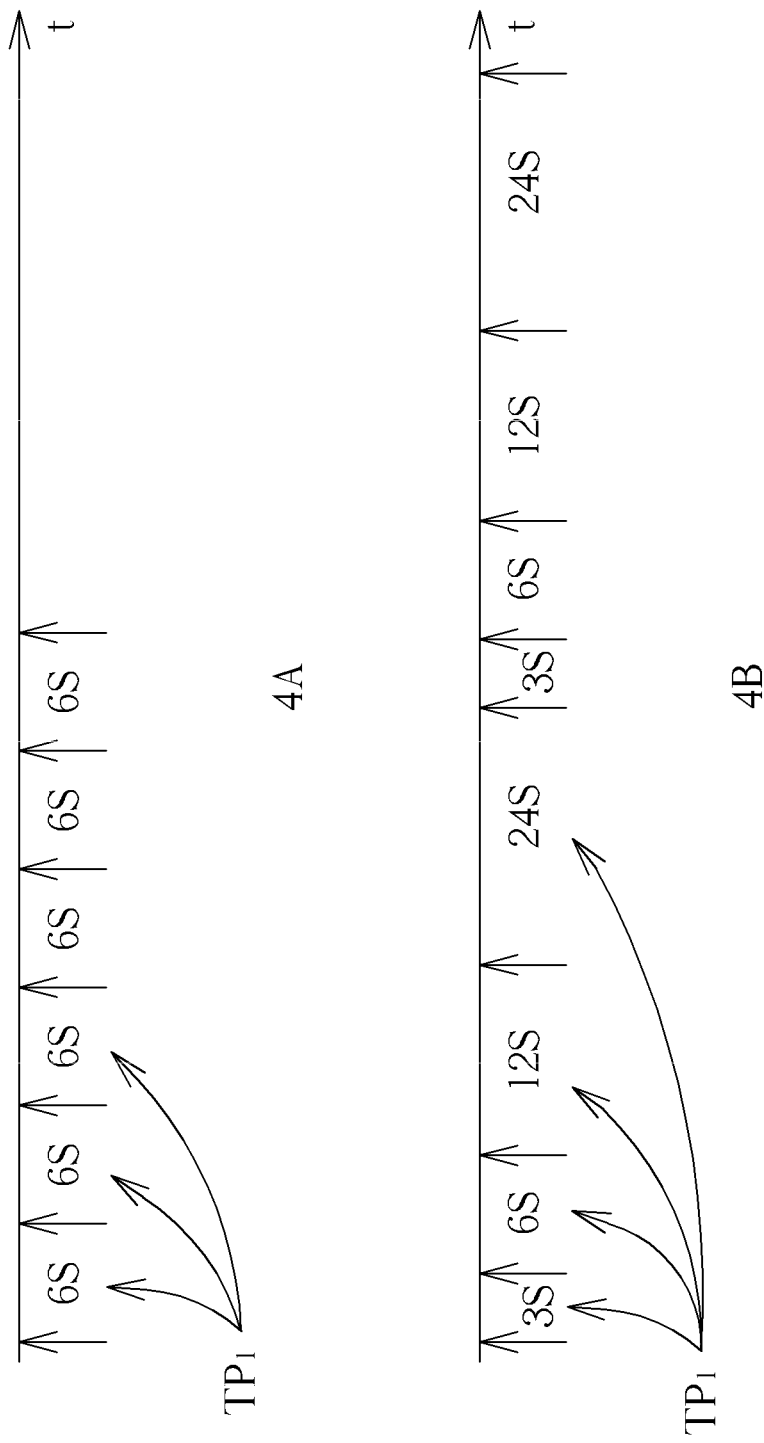
FIG. 4 (including 4A and 4B) is a diagram of an example of the counter shown in FIG. 2.

In the following, some examples are given to describe the settings and the operations of the counter 262 shown in FIG. 2. Please refer to FIG. 4. FIG. 4 (including 4A and 4B) is a diagram of an example of the counter 262 shown in FIG. 2. In the first example, as is shown in 4A, the counter 262 counts the time value to the threshold value $TP_1$, which is a fixed value (such as 6 seconds). Thus, the user equipment 230 transmits the other service request SR to the network 210 at six-second intervals. Such a method is typically suitable for real-time work or requests with higher urgency. In the second example, as is shown in 4B, the counter 262 counts the time value to the threshold value $TP_1$, which is an unfixed value (such as 3 seconds, 6 seconds, 12 seconds . . . ). Thus, the time interval for the first attempt on transmitting the other service request SR by the user equipment 230 is three seconds, the time interval for the second attempt on transmitting the other service request SR by the user equipment 230 is six seconds, and the time interval for the third attempt on transmitting the other service request SR the by the user equipment 230 is twelve seconds, and the rest can be deduced by analogy. Such method is typically suitable for non-real-time work or requests with lower urgency.

Please note that the abovementioned embodiments are presented merely for describing features of the present disclosure, and in no way should be considered to be limitations of the scope of the present disclosure. Those skilled in the art should observe that various modifications and alterations of the counter 262 and the threshold value $TP_1$ may be made.

The abovementioned embodiments are presented merely for describing the present disclosure, and in no way should be considered to be limitations of the scope of the present disclosure. In summary, the present disclosure provides a method for distributing network resources and related user equipment. Through determining whether the network is in the resource limited status, and through controlling the time interval (which can be a fixed threshold value or an unfixed threshold value) for transmitting the service request to the network when the network is in the resource limited status, the frequency and the work load of transmitting service requests handled by the network can be substantially decreased. Therefore, the actions of continuously establishing RRC connections and releasing RRC connections can be avoided. Especially when the network is under the resource limited condition, the network can distribute network resources more efficiently.

Those skilled in the art will readily observe that numerous modifications and alterations of the device and method may be made while retaining the teachings of the invention.

What is claimed is:

1. A method for distributing network resource, used in a user equipment, the method comprising:

transmitting a service request to a network for requesting that a connection be established between the network and the user equipment, wherein the connection and the service request respectively conform to a radio resource control (RRC) connection and a RRC connection request of a 3rd generation partnership project (3GPP);

determining the network is in a resource limited status when an unexpected release command for releasing the connection is received from the network after the connection is established, wherein when the user equipment is in a CELL_DCH status and receives the unexpected release command, the network is judged in the resource limited status;

counting a time value when the unexpected release command for releasing the connection is received from the network after the connection is established; and transmitting another service requesting when the time value is counted to a predetermined and fixed threshold value.

2. The method of the claim 1, wherein the network is a UMTS terrestrial radio access network (UTRAN).

3. The method of the claim 1, wherein the release command conforms to an RRC connection release command of a $3^{rd}$ generation partnership project.

4. A user equipment, comprising:

a request transmitting module, used for transmitting a service request to a network for requesting that a connection be established between the network and the user equipment, wherein the connection and the service request respectively conform to a radio resource control (RRC) connection and a RRC connection request of a 3rd generation partnership project (3GPP);

a judging module, used for determining the network is in a resource limited status when an unexpected release command for releasing the connection is received from the network after the connection is established, wherein when the user equipment is in a CELL_DCH status and receives the unexpected release command, the judging module the judge module judges the network is in the resource limited status; and a time interval control module, coupled to the request transmitting module and the judging module, for counting a time value when the unexpected release command for releasing the connection is received from the network after the connection is established; and transmitting another service requesting when the time value is counted to a predetermined and fixed threshold value.

5. The user equipment of the claim 4, wherein the network is a UMTS terrestrial radio access network (UTRAN).

6. The user equipment of the claim 4, wherein the release command conforms to an RRC connection release command of a $3^{rd}$ generation partnership project.

7. The user equipment of claim 4, wherein the user equipment is a mobile phone.

* * * * *